United States Patent [19]

Martin et al.

[11] Patent Number: 4,504,132

[45] Date of Patent: Mar. 12, 1985

[54] MULTIFUNCTION ELECTROMAGNETIC ACTUATOR AND CAMERA CONTROL APPARATUS EMLOYING SAME

[75] Inventors: William A. Martin, Fairport; James K. Lee, Pittsford, both of N.Y.

[73] Assignee: Eastman Kodak Company, Rochester, N.Y.

[21] Appl. No.: 463,105

[22] Filed: Feb. 2, 1983

[51] Int. Cl.³ .................... G03B 3/10; G03B 9/08
[52] U.S. Cl. ...................... 354/195.1; 354/234.1
[58] Field of Search .......... 354/234.1, 235.1, 270.1, 354/271.1, 195.1; 310/12–15, 36–38

[56] References Cited

U.S. PATENT DOCUMENTS

| | | | |
|---|---|---|---|
| 2,986,683 | 5/1961 | Lavet et al. | 310/36 X |
| 3,924,146 | 12/1975 | George | 310/12 X |
| 3,971,963 | 7/1976 | Koike et al. | 310/154 |
| 3,993,920 | 11/1976 | Sato | 310/66 |
| 4,033,693 | 7/1977 | Payrhammer et al. | 355/71 |
| 4,060,313 | 11/1977 | Kondo | 350/269 |
| 4,240,728 | 12/1980 | Wiedmann et al. | 354/38 |
| 4,333,722 | 6/1982 | Lee | 354/234.1 |
| 4,348,092 | 9/1982 | Hirohata et al. | 354/234.1 X |
| 4,413,895 | 11/1983 | Lee | 354/234.1 |

FOREIGN PATENT DOCUMENTS 3151602 9/1982 Fed. Rep. of Germany .
125928 8/1982 Japan .................. 354/234

*Primary Examiner*—John Gonzales
*Attorney, Agent, or Firm*—Thomas H. Close

[57] ABSTRACT

A multifunction electromagnetic actuator particularly suited for use in controlling exposure and focus in a photographic camera, includes a permanent magnet mounted between and spaced slightly from two substantially parallel plates of ferromagnetic material, to form a pair of magnetic gaps. First and second planar armatures comprising flat coils carried by sheets of insulating material are respectively mounted in the first and second magnetic gaps for movement in response to current applied to their respective coils. The resulting electromagnetic actuator is a compact powerful actuator capable of independently controlling two functions.

In a photographic camera, the first armature of the multifunction actuator is coupled to a shutter to control exposure, and the second armature is coupled to a moveable lens element to control focus.

6 Claims, 5 Drawing Figures

MULTIFUNCTION ELECTROMAGNETIC ACTUATOR AND CAMERA CONTROL APPARATUS EMLOYING SAME

BACKGROUND OF THE INVENTION

1. Field of the Invention

The present invention relates to electromechanical actuators of the type having a flat armature positioned to move in a magnetic gap, and more particularly to such actuators wherein the armature comprises a conductive pattern formed on a sheet of insulating material.

2. Discussion Relating to the Problem

Compact low-cost electromechanical actuators such as DC motors are employed in a wide variety of consumer products from toys to tape recorders and cameras. In many such applications, to take best advantage of available space in the apparatus, a thin, flat actuator is desirable since the thin, flat spaces are more readily available than bulky, cubic or prismatic volumes. To this end, it is known to employ an electromagnetic actuator having a thin, flat armature which resides for movement in a magnetic gap. U.S. Pat. No. 3,993,920 issued Nov. 23, 1976 to Sato, shows a flat, circular motor useful for example, in a tape recorder.

One embodiment of the motor, called a pancake motor, comprises a housing and a flat permanent stator magnet forming an annular magnetic gap between the magnet and one side of the housing. A thin, flat, circular armature comprises a printed circuit coil photofabricated on a thin, stiff sheet of insulating material having a central axle perpendicular to the plane of the armature. The armature is supported in the magnetic gap of the motor by a pair of bearings. Another embodiment of the motor, commonly called a cup or basket motor, comprises a cylindrical housing and a cylindrical permanent magnet forming a cylindrical magnetic gap between the magnet and the side of the housing. A thin cylindrical armature comprises a printed circuit coil photofabricated on a thin, stiff sheet of insulating material and formed into a cylinder. The armature has a central axle along the axis of the the cylinder. The armature is supported in the magnetic gap by a pair of bearings.

An improved actuator of the type described above is disclosed in U.S. Pat. No. 4,413,895 issued Nov. 8, 1983 to J. K. Lee, the improvement therein comprises making the armature very thin and compliant so that the armature is supported in the magnetic gap by the surfaces defining the gap. This feature minimizes friction problems associated with the armature coming into contact with the sides of the gap while maintaining a minimum sized gap for maximum power output of the actuator. In one embodiment disclosed in the application, a first compliant armature/actuator is employed to control a shutter in a camera, and a second compliant armature/actuator is employed to control the focus of a lens in the camera. The two actuators are integrated on a common mechanism plate that serves as a flux return path for the magnets associated with both actuators. Although such actuators are relatively compact, the use of a plurality of actuators to control a number of functions in the camera increases the weight and size of the camera control mechanism in proportion to the number of actuators employed. The present inventors were faced with the problem of controlling a number of functions with electromechanical actuators while minimizing the weight and size of the actuators employed.

SOLUTION—SUMMARY OF THE INVENTION

The above-noted problem is solved according to our invention by providing a multifunction, electromagnetic actuator having a permanent magnet mounted between and spaced slightly from two substantially parallel plates of ferromagnetic material, to form a pair of magnetic gaps. First and second planar armatures comprising flat coils carried by sheets of insulating material are respectively mounted for movement in the first and second magnetic gaps in response to current applied to their respective coils. The resulting electromagnetic actuator is a compact powerful actuator capable of independently controlling two functions. In a preferred implementation of the multifunction, electromagnetic actuator, the first armature of the actuator is coupled to a shutter to control exposure in a photographic camera, and the second armature is coupled to a moveable lens element to control focus. The resulting camera control mechanism is particularly well suited for use in a folding-type camera since there are no mechanical connections required to the lens board for controlling the exposure and focus of the camera.

BRIEF DESCRIPTION OF THE DRAWINGS

The invention will be described with reference to the accompanying drawings, wherein.

DESCRIPTION OF THE PREFERRED EMBODIMENTS

Figure 1:
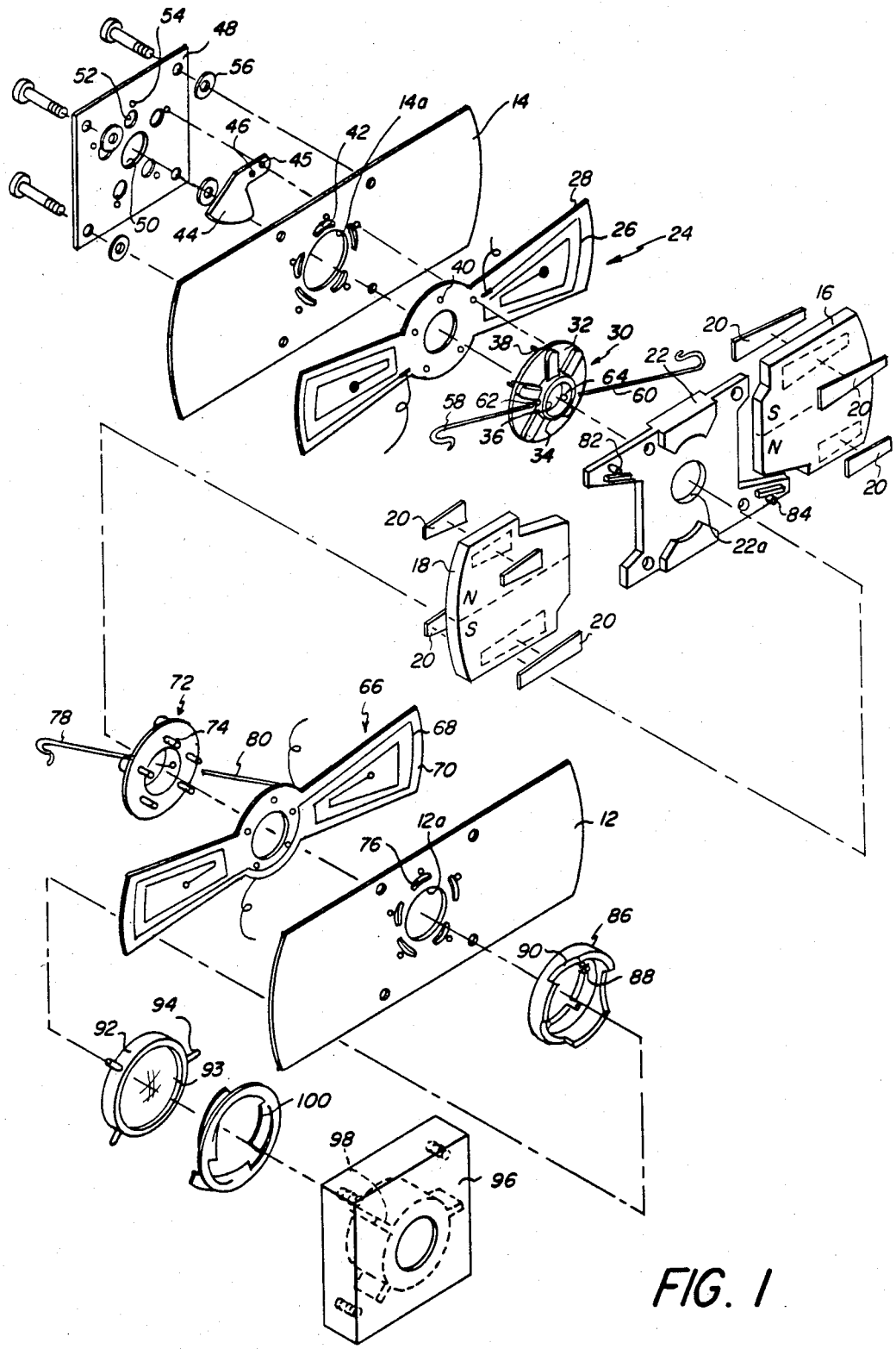
FIG. 1 is an exploded perspective view of a multifunction, electromagnetic actuator according to the present invention utilized in focus and exposure control apparatus.

FIG. 1 shows an exploded perspective view of a multifunction, electromagnetic actuator according to the present invention. The actuator comprises a housing formed by mild steel top and bottom plates 12 and 14 respectively. Sandwiched between the top and bottom plates are a pair of relatively thin, flat generally keystone shaped ceramic magnets 16 and 18. Each magnet comprises two segments magnetized in a direction generally perpendicular to the plane of the magnet and in generally opposite directions to each other. The magnets are spaced from the top and bottom plates by thin spacers 20 of nonmagnetic material to form magnetic gaps on both sides of permanent magnets 16 and 18. A central support member 22 formed of nonmagnetic material such as plastic, is located between magnets 16 and 18. Both top and bottom plates 12 and 14 and support member 22 define central apertures 12a, 14a and 22a respectively. Located in the magnetic gap formed between bottom plate 14 and magnets 18 and 16, is a first armature generally designated 24, comprising a printed circuit coil 26 on a sheet of insulating material 28. Armature 24 includes a rigid hub 30 comprising an annular portion 32 and a cylindrical portion 34 around a central aperture 36. Extending from the backside of annular portion 32, are five equally spaced lugs 38. The lugs 38 extend through five holes 40 in coil support sheet 28. Rigid hub 30 is adhesively bonded to coil support sheet 28. Cylindrical portion 34 of rigid hub 30 is received in aperture 22a of central support member 22 to support armature 24 for rotation about its central aperture. Lugs 38 extend through five slots 42 in bottom plate 14.

Five shutter blades 44 (only one of which is shown) are pivotally mounted on pins (not shown) carried on the backside of plate 14. The pins extend through holes 45 in shutter blades 44. Lugs 38 extend through holes 46 in shutter blades 44 to drive the shutter when armature 24 rotates in the magnetic gap.

A cover plate 48 having a central aperture 50 and peripheral apertures 52 and 54 for receiving lugs 38 and the mounting pins for the shutter blades 44 is spaced from bottom plate 14 by washers 56 to retain the shutter blades in place.

Figure 2:
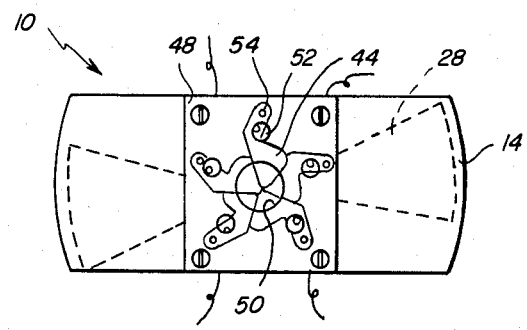
FIGS. 2 and 3 are plan views of the assembled electromagnetic actuator shown in FIG. 1, viewed from the shutter side, showing the shutter fully closed and fully open respectively.
Figure 3:
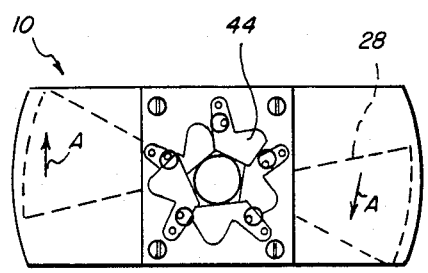
Figure 4:
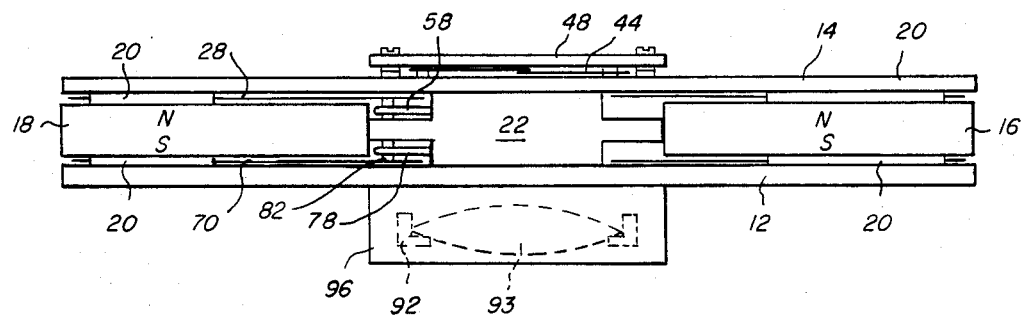
FIG. 4 is a top view of the assembled multifunction actuator shown in FIG. 1.

FIG. 2 is a plan view of the assembled shutter/actuator with the shutter closed. The armature 24 is normally urged in a counterclockwise direction, as seen in FIG. 2, by a pair of cantilever springs 58 and 60 (see FIG. 1). The cantilever springs 58 and 60 are hooked on one end and attached by their hooks to support member 22 about posts (not shown) extending from support member 22. The other ends of springs 58 and 60 are received in holes 62 and 64 in the cylindrical portion 34 of hub 30. When a current is applied by camera control circuitry to coil 26 of armature 24, the armature is caused to rotate in the direction of arrows A in FIG. 3, thereby opening the shutter. FIG. 3 is a plan view of the assembled shutter actuator with the shutter fully opened.

Returning now to FIG. 1, a second armature 66 identical to armature 24 is located in the second magnetic gap formed by front plate 12 and magnets 18 and 16. The second armature likewise comprises a coil 68 printed on a flexible insulating sheet 70 and supported by a rigid hub 72 having five lugs 74 extending therefrom. Similarly, slots 76 are provided in front plate 12 for the passage of lugs 74. Cantilever springs 78 and 80 mounted on pins 82 and 84 respectively of the support member 22 urge armature 66 in a clockwise direction as seen in FIG. 1. A cam ring 86 located on the outside of front plate 12 has five slots 88 for receiving the five lugs 74 of armature 66 and three cam surfaces 90 equally spaced around the periphery of the cam ring 86. A moveable lens holder 92 having three radial cam follower extensions 94 is received in cam ring 86 with cam follower extensions 94 resting on cam surfaces 90. A stationary lens housing 96 covers cam ring 86 and lens holder 92 and defines slots 98 which cooperate with cam follower extensions 94 to restrict rotational movement of lens holder 92. A flat washer spring 100 is located in the lens housing 96 to urge the lens holder 92 into contact with cam ring 86.

Normally, when no curent is flowing in coil 68 of armature 66, cantilever springs 78 and 80 urge armature 66 in a clockwise direction, as seen in FIG. 1, and cam follower portions 94 of lens ring 92 rest on the lower portions of cam surfaces 90 of cam ring 86 placing lens 93 at its infinity focus position. When a current is applied to coil 68 of armature 66, the armature rotates in a counterclockwise direction, as seen in FIG. 1, thereby rotating cam ring 86 in a counterclockwise direction. Since lens holder 92 is constrained by lens housing 96 from rotating, the cam follower portions 94 ride up the cam surfaces 90 of cam ring 86, thereby moving lens 93 toward a near focus position and compressing spring 100. When current is removed from armature 66, cantilever springs 78 and 80 return the armature to its initial position, thereby returning lens 93 to infinity focus.

Figure 5:
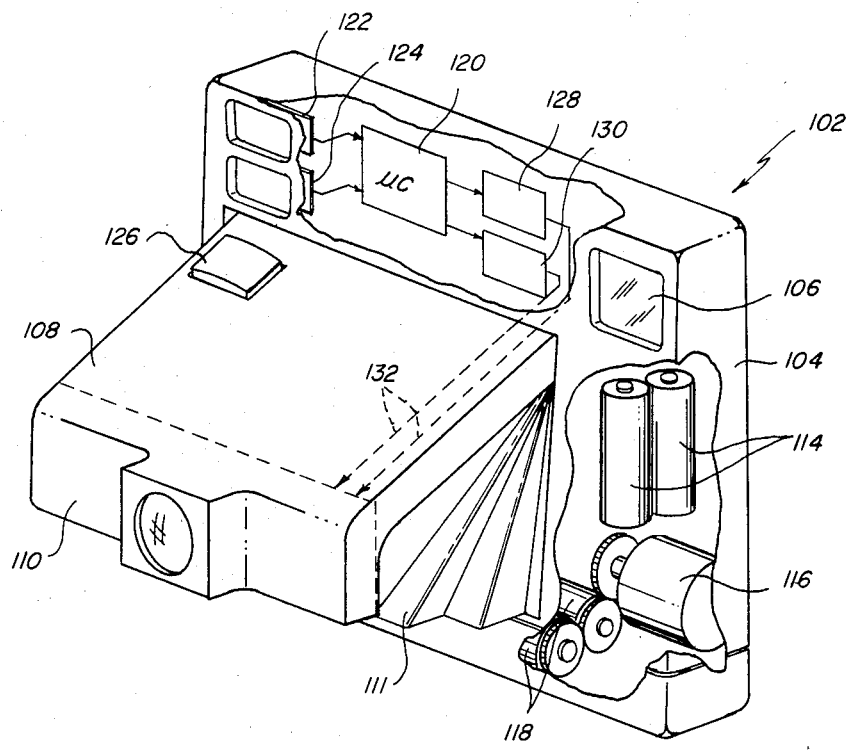
FIG. 5 is a schematic diagram showing a photographic camera of the instant folding type having a multifunction actuator according to the present invention.

Referring now to FIG. 5, the use of a multifunction electromagnetic actuator according to the present invention to control exposure and focus in a folding instant camera is illustrated. The camera generally designated 102 includes a camera body 104 defining an aperture for viewfinder optics 106 and having a folding cover door 108 hinged to the front of the camera body. A lens board 110 is carried by the distal end of cover door 108. The lens board comprises the multifunction, electromechanical actuator for controlling exposure and focus as shown in FIG. 1. A bellows 111 connected between the camera body 104 and the cover door 108 forms a light tight housing for the optical path of the camera.

The camera is power by batteries 114 which supply power to a film drive motor 116 which drives pressure rollers 118 in a known manner. The batteries 114 also supply power to a camera control circuit including a microcomputer 120. A light sensitive circuit 122 measures scene light and supplies scene light information to microcomputer 120 in a known manner. A distance measuring circuit 124 measures the distance to the photographic object and supplies distance information to microcomputer 120.

When the camera user actuates a release button 126, the microcomputer calculates the desired exposure and lens position based on the inputs from light sensitive circuit 122 and distance measuring circuit 124 according to a program stored in a memory in the microcomputer, and signals current drivers 128 and 130 connected to the respective armatures in the multifunction actuator to control the exposure and the focus of the camera via flexible control leads 132.

The use of the multifunction, electromechanical actuator eliminates the need for active mechanical coupling between the lens board 110 and the body of the camera, thereby facilitating the design of a compact folding camera.

Although the preferred embodiment of the invention was described with reference to an exposure and focus control mechanism in a photographic camera, a multifunction actuator according to the present invention could also be employed to perform other functions in a camera, or in other apparatus requiring electromechanical actuators.

The invention has been described in detail with particular reference to certain preferred embodiments thereof, but it will be understood that variations and modifications can be effected within the spirit and scope of the invention.

What is claimed is:

1. In combination with a camera, a dual function electromagnetic actuator, comprising:
   a permanent magnet having two opposite generally parallel sides, magnetized in a direction generally perpendicular to the sides;
   a first plate of mild steel position with respect to one of said sides to form a first magnetic gap;
   a first armature comprising a planar coil carried by a sheet of insulating material, and mounted for movement in said magnetic gap, and mechanically coupled to a first camera element to actuate said first camera element;

a second plate of mild steel spaced away from the opposite side of said magnet to define a second magnetic gap; and a second armature comprising a planar conductive coil carried by a sheet of flexible insulating material, and mounted for movement in said second magnetic gap, and mechanically coupled to a second camera element.

2. The invention claimed in claim 1, wherein said first camera element is a shutter/aperture, and wherein said second camera element is a moveable lens element for adjusting focus.

3. The invention claimed in claim 2, wherein said camera is a folding-type camera, and said dual function electromagnetic actuator comprises the lens board of the folding camera, whereby active mechanical connection to the lens board for operating the exposure control and focus mechanism is obviated.

4. The invention claimed in claim 2, wherein said actuator defines a central aperture generally centered on the optical axis of the camera, said armatures further comprise rigid hubs to which the sheets of insulating material are attached, mounted for rotation about said optical axis, said hub of said first armature being coupled to a plurality of shutter blades, and said hub of said second armature being coupled to a moveable lens element.

5. The invention claimed in claim 1, further comprising a second permanent magnet positioned between said first and second plates to form a second pair of magnetic gaps, said first and second armatures including second coils positioned in said second set of gaps.

6. An automatic focus and exposure control mechanism for a camera, comprising:

a flat permanent magnet having substantially parallel opposite surfaces, magnetized generally perpendicularly to said surfaces;

a first sheet of ferromagnetic material positioned with respect to a first one of said surfaces to define a first magnetic gap;

a first armature comprising a flat coil carried by a sheet of insulating material, mounted for movement in said first magnetic gap in response to a current in said flat coil;

shutter means for covering and uncovering an exposure aperture, said shutter means being coupled to said first armature for covering and uncovering movement;

a second sheet of ferromagnetic material positioned with respect to the opposite surface of said permanent magnet to define a second magnetic gap;

a second armature comprising a flat coil carried by a sheet of insulating material, mounted for movement in said second gap in response to a current in said flat coil;

lens means, moveable for focusing the camera, said moveable lens means being coupled to said second armature for focusing movement in response to movement of said second armature.

* * * * *